United States Patent [19]

Moore

[11] 3,766,638

[45] Oct. 23, 1973

[54] WAFER SPREADER

[75] Inventor: Arthur H. Moore, Campbell, Calif.

[73] Assignee: Hugh Industries, Inc., Sunnyvale, Calif.

[22] Filed: Jan. 3, 1972

[21] Appl. No.: 215,230

Related U.S. Application Data

Division of Ser. No. 68,287, Aug. 31, 1970, Pat. No. 3,714,704

[52] U.S. Cl. .......................... 29/583, 29/574, 225/2, 29/589

[51] Int. Cl. .............................................. B01j 17/00

[58] Field of Search ....................... 29/583, 580, 589, 29/590; 225/2

[56] References Cited

UNITED STATES PATENTS 3,562,057 2/1971 McAlister et al. .................... 29/583

3,448,510 6/1969 Bippus et al. ......................... 29/583

*Primary Examiner*—Charles W. Lanham

*Assistant Examiner*—W. C. Tupman

*Attorney*—Harry R. Lubcke

[57] ABSTRACT

A method for separating pieces (dies) of a semiconductor wafer in which the wafer is attached to a vinyl film, scribed, broken, and the film stretched in all radial dimensions. A plunger-type device having a rounded chamfer in contact with the film and a teflon or nylon surface is used to stretch the film radially by deforming it axially. The film is heated for attaching the wafer and for the stretching process. A vacuum step may be employed to enhance wafer-film adherence.

4 Claims, 5 Drawing Figures

WAFER SPREADER

This is a division of application, Ser. No. 68,287 filed Aug. 31, 1970.

BACKGROUND OF THE INVENTION

A method and apparatus for separating and holding the many dice (separate electrical entities) normally formed upon a wafer of semiconductor material in manufacturing for subsequent test and individual utilization.

A widespread practice in the semiconductor manufacturing industry is to store individualized dies from one wafer in a small vial. Upon testing these or mounting the same for ultimate use, the dies must be dumped out upon a mirror or other work station and turned over and oriented as required. This involves considerable labor and the possibility of scratching the dies.

Dies have been arranged on flexible strips by employing an adhesive after being individualized. They are subsequently removed from the strips by bending the strips over a projection of small radius. The edges of each die are thus separated from the strip and a tweezer mechanism picks them off for mounting.

BRIEF SUMMARY OF THE INVENTION

A highly efficient and safe method for handling individual dies from a single wafer is provided by employing a plastic film to which the wafer directly adheres under conditions of elevated temperature during the time the same are brought together. The whole wafer is attached. It is then scribed and broken. The plastic is then expanded laterally in all directions and separations take place between each die without these coming off of the plastic. Testing, storing and conveniently oriented positioning are accomplished with the original configuration of the wafer retained as a whole.

A plunger-type device employing a teflon or nylon coated button to move against the under side of the film and thus expand it while the periphery of the film is held is employed to carry out the important separating step.

The plunger may be pneumatically operated.

A vacuum plate adhesion pre-step may be performed.

DESCRIPTION OF THE PREFERRED EMBODIMENTS

The process of this invention involves adhering a semiconductor wafer to a larger piece of plastic. Such plastic is available, such as a vinyl, having self-adhesive properties to semiconductor material when at an elevated temperature, within the range of 60° to 250°C. At such temperatures the plastic material has not become "plastic"; that is, it has not softened. It has been found that what may be called surface tension between the wafer and the plastic material is enhanced at the elevated temperature.

The advantage over the art in omitting any specific adhesive is obvious. The pieces of the wafer (dies) are removable from the plastic without retaining a coating of the plastic on the dies by merely exerting a specific physical force, such as that exertable by the known vacuum needle. Separation does not occur spontaneously with time, nor if the assembly is subjected to mechanical shock or various atmospheric conditions.

Figure 1:
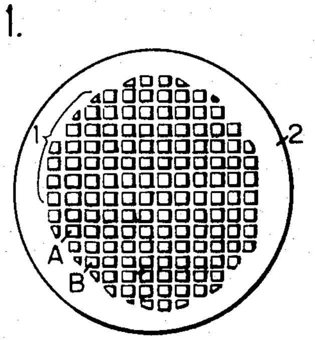
FIG. 1 is a plan view of a separated wafer upon a plastic film after having been processed in the expander device.

In FIG. 1 a wafer generally indicated by reference numeral 1 is shown in the spread or already processed configuration. The dies A, B, etc. have been separated so that the diode, transistor, or integrated circuits that may have been previously formed within each die may be separately electrically tested, identified, and ultimately removed for individual mounting and use. Each of the dies is self-adhesively attached to the larger piece of plastic 2. FIG. 1 thus shows the result of the processing according to this invention.

Figures 2, 5:
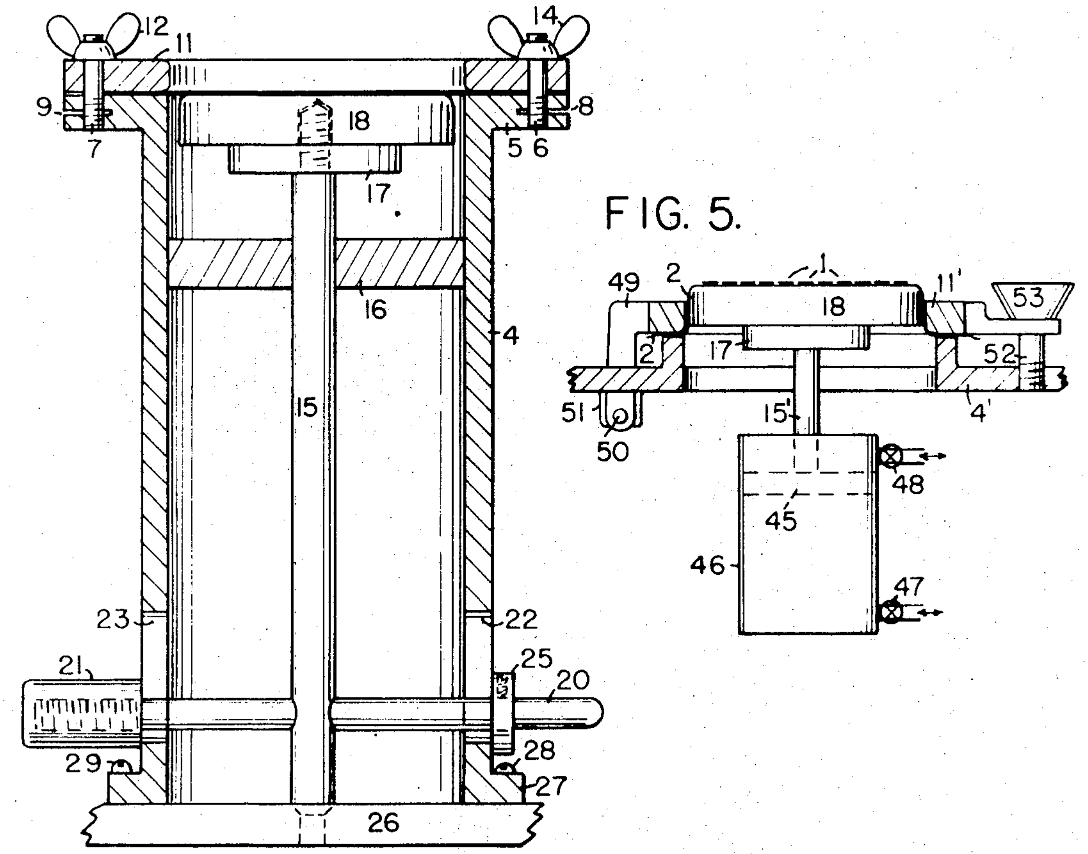
FIG. 2 is a sectional elevation view of the spreader device.
FIG. 5 is a partially schematic view of a pneumatic embodiment.

FIG. 2 shows an apparatus for accomplishing the processing shown in FIG. 1. The outer tubular body 4 is shown in section across a diametric plane so that the internal parts may be more easily illustrated.

The apparatus may be made in a wide range of sizes in order to accommodate wafers of a large range of diameters, but an internal diameter of 3 inches for body 4 and a length of 7 inches handles the usual wafer sizes of the order of 1 to 1½ inches in diameter. An upper collar 5 around the top of body 4 holds at least a pair of threaded studs 6, 7. Slots 8, 9 are deformed slightly after formation so as to hold the studs tightly. Movable collar 11 has holes to pass the studs, upon which it is slidable vertically. Wing nuts 12, 14 turn on threads on the upper ends of the studs. This allows a piece of plastic, typically of circular shape, 2, as in FIG. 1 but having a larger diameter, such as to the outside of ring 5 in FIG. 2, to be tightly clamped between collars 5 and 11.

Within body 4, shaft 15 is centrally journaled in bearing disk 16. An inner hole in the latter carries shaft 15, while the outer circumference is tightly attached to the inner surface of body 4. Bearing disk 16 has sufficient axial extent to provide the principal lateral stability for shaft 15.

Back-up plate 17 is screwed onto the upper end of shaft 15, to insure that button 18, surmounting it, will remain with its upper surface at right angles to the axis of shaft 15. All of the elements recited up to and including 17 are typically of metal, such as machinable aluminum alloy, with stainless steel for the studs and wing nuts. However, button 18 is in contact with plastic diaphram 2 and it has been found that either teflon or nylon is a preferred material for this contact. Teflon, particularly, has a self-lubricating characteristic. A button block may be capped or coated with teflon or nylon.

The upper surface of the button is smooth and the upper periphery is rounded. Additionally, the aperture in movable collar 11 is also rounded at the upper and lower extremities thereof. These rounded surfaces are provided to prevent tearing plastic film 2 during the stretching step of the process.

Shaft 15 is conveniently moved upward by an operator grasping handle 20 that passes through it transversely near the bottom of the same with one hand and handle-extension 21 with the other. The handle extends beyond body 4 through slots 22 and 23. Handle-extension 21 is internally threaded and handle 20 is externally threaded. Thrust collar 25 is suitably rigidly attached to handle 20 on the side opposite extension 21, so that it bears against the external surface of body 4. It is seen that when extension 21 is screwed tightly against the opposite surface of body 4 the handle and shaft 15 is held rigidly with respect to the body. In order to raise the shaft the operator loosens extension 21 by rotating it and exerts an upward force on both elements 20 and 21.

In view of this kind of manipulation it is desirable that body 4 be anchored to a massive element, such as bench top 26. This is accomplished by providing body 4 with a lower rim 27. Through holes in the rim are passed mounting screws 28, 29, and others not shown.

OPERATION

For the apparatus described a circular piece of vinyl film plastic 2 is provided, having a diameter of the order of 4 inches. The plastic is heated to a temperature within the range of from 60° to 250°C, depending upon the surface finish. The semiconductor wafer is attached to it by a slight pressure, usually manually. After a brief instant of cooling the operator scribes the wafer as required to divide the many devices formed upon it into individual squares. The wafer is then "cracked" along each scribe mark by known methods, such as a manual roll station. The dies remain adhered to the plastic.

A warmed button 18 is then placed on shaft 15, resting on backing-plate 17. With the same in the lowered position, as shown in FIG. 2, plastic disk 2, with the fully cracked wafer on top, is placed upon upper collar 5; movable collar 11 having been previously removed. Collar 11 is then replaced and the plastic rigidly held by tightening wing nuts 12 and 14.

Handle-extension 21 is then loosened enough to free shaft 15 and an upwards pressure is exerted by the operator lifting handle 20 and handle-extension 21. This causes button 18 to force plastic 2 into an inverted cup shape, all the time causing a radial expansion throughout the plastic. This step puts a permanent stretch in the plastic and thus separates the many dies, one from the other. A brief period is allowed for cooling, after which the spacing between dies remains as it was formed by the stretching.

Normally, button 18 and plastic 2 carrying the separated dies are removed as a unit. Various electrical tests may then be made upon the dies. Since these are all still in the same relation occupied in the original wafer, an initial test can be made on representative dies; say, one in each quadrant of the typical circular wafer. This gives an index of what is to be expected in that quadrant. Should one quadrant be found to be defective, there is no need to further (individually) mount the relatively many dies therein. This procedure reduces manufacturing costs by preventing useless labor.

Figure 3:
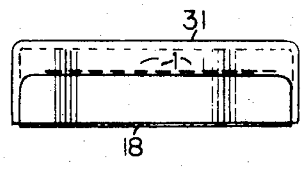
FIG. 3 is a side elevation view of a shipping container employing the method and materials of this invention.

With or without testing the dies-plastic-button assembly may be stored or transported. When this is for a period of time in excess of one day, and when the assembly is to be taken from a clean room in which it may have been manufactured, additional cover element 31 of FIG. 3 is employed. This is of the nature of an inverted Petrie dish, or a plastic equivalent. The diameter thereof is such as to just fit around button 18 with plastic 2 on it, and the height is such as to leave a space between the tops of the dies and the inner surface of the cover. It has been determined that considerable mechanical shock can be endured in handling or shipping this assembly without the dies separating from the plastic. Should cover 31 not be employed, the equivalent without a top surface in the form of a clamp ring is desirable. This may be a solid ring with the proper internal diameter to fit around the periphery of the button with the plastic.

It has been found that the spacing between individual dies of a wafer, upon being separated according to this invention, is proportional to the size of the individual dies. If there are several sizes of dies on one wafer this proportional effect takes place automatically. If there are a large number of small dies, maximum stretching is in order to provide the many spaces required across the wafer. Such spaces should be sufficiently wide to allow easy application of test probe contacts for electrical testing. If there are a small number of dies per wafer, then minimum stretching suffices, unless a proportionally large separation is desired between the dies. It is known that the plastic film between dies with large spacing between them is thinner than for small spacings. This spacing behavior is unexpected, but desired practical results may easily be obtained.

While the process recited above produces excellent adhesion of the wafer to the film when the wafer is flat and smooth, as obtained by both lapping and etching; such results may not be obtained when the wafer is only lapped. Also, gold-backed heavily-oxided wafers have been found to be difficult to retain upon the film after the separating process. Further, in certain applications it is an advantage that the wafer be held sufficiently strongly to the plastic film for the spreading process, but that the separate dies be quite easily removable thereafter.

All of these objectives may be attained by creating a vacuum between the heated wafer and the plastic film as these are joined. This takes the form of a pre-step, performed before the previously enunciated steps are performed.

Figure 4:
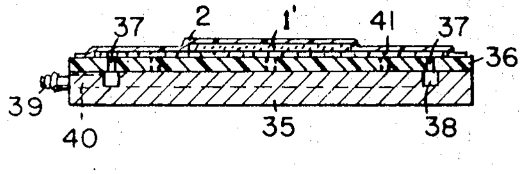
FIG. 4 is a sectional elevation of a vacuum plate for attaching the film.

Additional apparatus in the form of a vacuum plate 35 of FIG. 4, having a diameter of the order of one-third greater than that of buttons 18, is required. Plate 35 may be of black anodized aluminum. This part is surmounted by a relatively firm rubber-like layer 36, having a thickness of about one-eighth inch. Commercially obtainable neoprene is a suitable material. This provides a quasi-resilient carrier.

The rubber layer is pierced with a plurality of apertures 37, such as eight, circumferentially arranged at a diameter greater than that of any wafer that is to be processed. A diameter of 3¾ inches for the aperture circle and a diameter of the order of one-sixteenth inch for each aperture is suitable. Directly below these apertures a fully circumferential groove 38 connects each of them together and a connecting radially-extending passage 40 extends to exhaust fitting 39. The latter is typically circumferentially located between two of the apertures 37.

In use, a vacuum plate is heated to a temperature within the range of from 60° to 250°C. A disk of filter paper 41, having a diameter greater than the diameter of the aperture circle is centered upon the rubber part of the vacuum plate so that it covers all of the apertures 37. The filter paper constitutes a porous membrane and so spreads the vacuum-produced decrease of air pressure from the several apertures to essentially all over the area of the rubber layer.

A wafer 1', to be spread, is placed upon the filter paper, centrally located thereon, with the semiconductor diffusion and/or other in-formed electrical elements downward; i.e., toward the filter paper. Normally, this is also the scribed side downward.

A piece of plastic film 2, of sufficient size as previously described, is now laid over the wafer, the filter paper and the rubber layer; and extending radially beyond the filter paper.

A vacuum is then created at fitting 39 by connection to a known vacuum pump and the plastic film takes the position shown in FIG. 4. It closely follows the contour of the wafer and the filter paper. This configuration is largely consequential; it is the intimate and relatively complete contact between the wafer and the plastic film that provides the strong bond between the two.

With this vacuum pre-step mode of processing the previously scribed wafer 1' is cracked while the wafer is on the vacuum plate and while the vacuum is applied. A separate manual roll station is not required. Rubber layer 36 provides resiliency. By employing a metallic roller (not shown), of say ¼ inch diameter, the operator rolls the roller over the plastic film and cracks the wafer. Such rolls are normally made at right angles, one to the other, collinearly with the scribe lines.

Subsequently, vacuum plate 35 is inverted and placed over a heated button 18 arranged for further processing, as indicated in FIG. 2. The vacuum is released. The vacuum plate and filter paper 41 are removed from wafer 1' and plastic film 2. The latter are now processed for spreading, as has been previously described.

An alternate embodiment of the spreading apparatus of FIG. 2 is possible, as shown in FIG. 5. Briefly, the movable collar is hinged instead of being detachably fastened, and the manual means formerly used for exerting the upward translative force is now pneumatic. The mechanism is shown in the fully actuated position in FIG. 5, whereas it was shown in the initial before-actuation position in FIG. 2.

In FIG. 5, button 18 and back-up plate 17 are as in FIG. 2. Shaft 15' is the equivalent of shaft 15; having, however, a pneumatic piston 45 operative in cylinder 46 to accomplish the spreading pneumatically. Inlet-outlet valve assemblies 47, 48 control the upward and downward motion of piston 45; a greater than atmospheric pressure at open valve 47 with valve 48 open to the atmosphere causes the piston to move upwards, and vice versa. This is equivalent to the functioning of the piston-cylinder of a steam locomotive.

Hydraulic rather than pneumatic operation may also be used.

Frame 4' in FIG. 5 is the equivalent of element 4 of FIG. 2, although the shapes are much different. Cylinder 46 and auxiliary elements are supported to frame 4' in a known manner.

Movable collar 11' is the equivalent of prior element 11, but is carried by hinge member 49 in FIG. 5. The hinge is pivoted by pivot 50, which is supported by projection 51 from the under side of frame 4'. The opposite end of the hinge member is removably securable to the frame by coarse-threaded screw 52, having operator's knob 53.

The mode of operation of the pneumatic embodiment is the same as that of the manual embodiment of FIG. 2. The upward and downward motion of the pneumatic embodiment may be controlled by an electrical push-button with a simple circuit to actuate solenoid valves 47 and 48 in the manner previously described.

An adjustable stop, typically of a mechanical nature, is provided either internally or externally to cylinder 46 to limit the upward excursion of piston 45 to an extent found desirable by the operator.

I claim:

1. The process of separating adjacent pieces of a wafer which includes the steps of;

a. adhering a heated wafer to a single, flat film of plastic by creating a vacuum between the two,
b. breaking said wafer into closely adjacent pieces, and
c. radially expanding said film of plastic while flat and while maintaining a heated condition of said film and said wafer, whereby adjacent pieces of said wafer are retained upon said film in a separated configuration.

2. The process of separating adjacent pieces of a wafer which includes the steps of;

a. heating said wafer and a larger single, flat film of plastic,
b. adhering said wafer upon said plastic while both are heated,
c. scribing said wafer into plural discrete areas,
d. breaking said wafer into plural pieces corresponding to said areas,
e. radially expanding said film of plastic in all directions while flat, and
f. retaining said film of plastic expanded,
whereby adjacent pieces of said wafer are retained upon said film of plastic in a separated configuration.

3. The process of claim 2, in which;

a. the temperature of said heating is within the range of from 60° to 250°C.

4. The process of separating adjacent pieces of a semiconductor wafer which includes the steps of;

a. heating a flat, relatively large quasi-resilient carrier,
b. placing a porous membrane upon said carrier,
c. placing a scribed wafer upon said porous membrane,
d. placing a film of plastic larger than said wafer over said wafer,
e. drawing a vacuum through said porous membrane to adhere said film of plastic to said wafer,
f. breaking said wafer into plural pieces corresponding to the scribing thereon,
g. releasing said vacuum, and
h. radially expanding said film of plastic while flat to separate the plural pieces of the wafer, whereby adjacent pieces of said wafer are retained upon said film of plastic in a separated configuration.

* * * * *